Nov. 15, 1966  D. R. CARLISLE ET AL  3,285,007
FUEL INJECTOR FOR A GAS TURBINE ENGINE
Filed Oct. 26, 1964
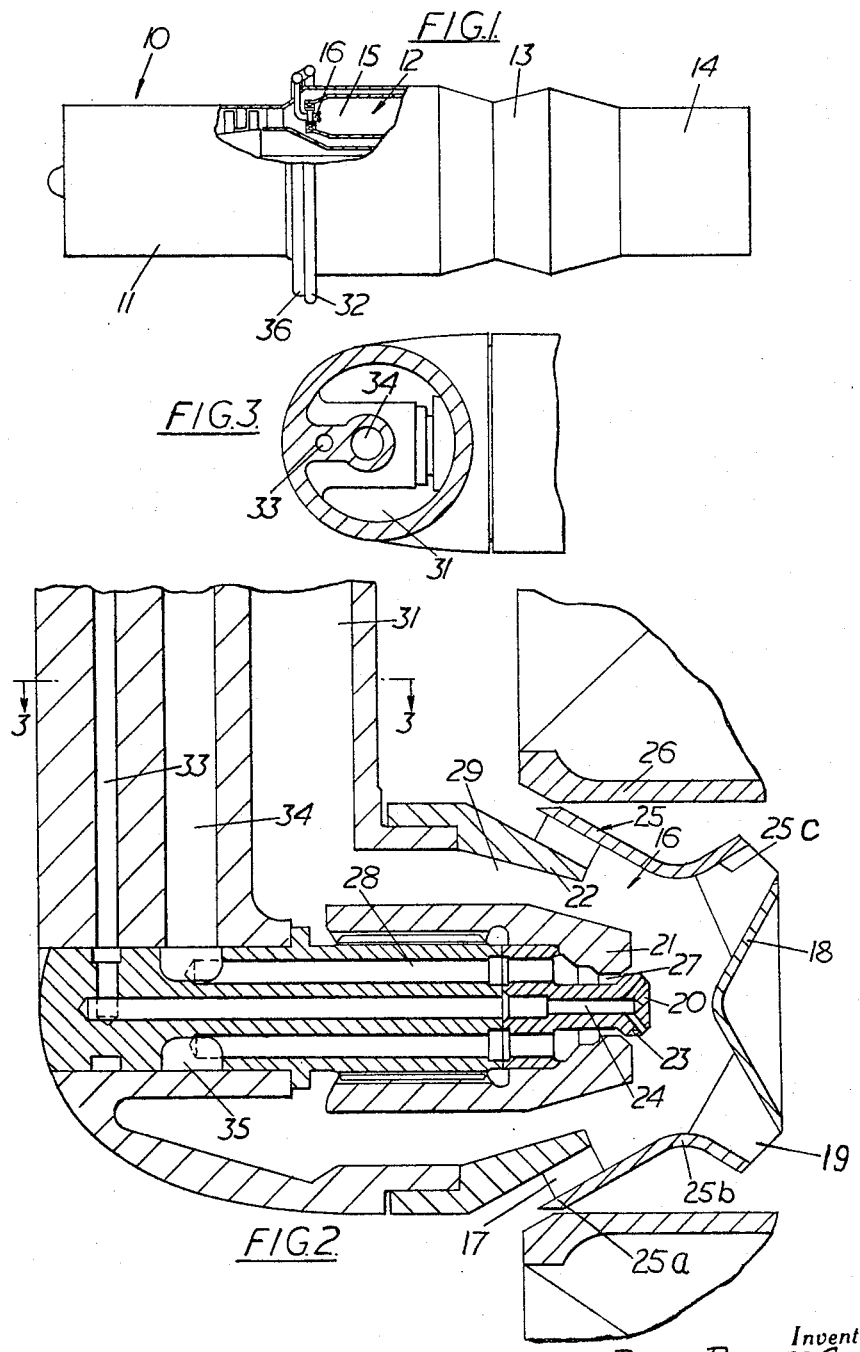
Inventors
DENIS RICHARD CARLISLE
ROBERT GANI
By ALBERT ERNEST WELDON
Cushman, Darby & Cushman
Attorneys United States Patent Office 3,285,007
Patented Nov. 15, 1966

3,285,007
FUEL INJECTOR FOR A GAS TURBINE ENGINE
Denis Richard Carlisle, Risley, England, Robert Gani, Chadstone, Melbourne, Victoria, Australia, and Albert Ernest Weldon, Ilkeston, England, assignors to Rolls-Royce Limited, Derby, England, a company of Great Britain
Filed Oct. 26, 1964, Ser. No. 408,455
Claims priority, application Great Britain, Nov. 11, 1963, 44,479/63
5 Claims. (Cl. 60—39.74)

This invention concerns a fuel injector for a gas turbine engine.

According to the present invention, there is provided a fuel injector for a gas turbine engine comprising a plurality of concentric nozzles, means for supplying fuel to each of said nozzles, a shroud mounted about and spaced from the outermost of said nozzles, and baffle means supported by said shroud and disposed downstream of said nozzles, the arrangement being such that in operation of the injector, the fuel emitted by said nozzle passes through said shroud simultaneously with a flow of air therethrough, and passes between said shroud and said baffle means.

It will be appreciated that in a fuel injector according to the present invention, the risk that a nozzle which is not in use at any particular time will carbon up is reduced by reason of the fact that the fuel from the remaining nozzle or nozzles is carried away therefrom by the said flow of air.

The said outermost nozzle may be a gas nozzle, the other nozzle or nozzles being liquid nozzles.

The said nozzles may comprise a relatively small central liquid nozzle for pilot fuel which is concentrically surrounded by a relatively large annular liquid nozzle for main fuel.

Preferably at least one gas duct is provided for supplying gas to the gas nozzle, there being mounted within the or each gas duct two liquid ducts for supplying fuel respectively to the said central and annular liquid nozzles.

The invention also comprises a gas turbine engine provided with a fuel injector as set forth above.

The invention is illustrated, merely by way of example, in the accompanying drawings, in which:

FIGURE 1 is a diagrammatic view, partly in section, of a gas turbine engine provided with a fuel injector according to the present invention, FIGURE 2 is a broken away sectional view on a larger scale of the fuel injector shown in FIGURE 1, and FIGURE 3 is a section taken on the line 3—3 of FIGURE 2.

Referring to the drawings, a gas turbine engine 10 comprises in flow series one or more compressors 11, combustion equipment 12, and one or more turbines 13, the turbine exhaust gases being directed to atmosphere through an exhaust duct 14.

The combustion equipment 12 comprises a plurality of angularly spaced apart flame tubes 15. Each of the flame tubes 15 is provided at its upstream end with a fuel injector 16.

Each fuel injector 16 comprises a relatively small, centrally disposed, liquid nozzle 20 for the pilot fuel, the nozzle 20 being concentrically surrounded by a relatively large annular liquid nozzle 21 for the main fuel. The nozzle 21 is itself concentrically surrounded by a gas nozzle 22. The downstream ends of the nozzles 20, 21, 22 are in substantial alignment.

The downstream end of the nozzle 20 is provided with drilling 23 which communicate at their upstream ends with a pilot fuel passage 24 and which communicate at their downstream ends with the interior of a shroud 25. The shroud 25, which is mounted about and spaced from the nozzle 22, is itself concentrically surrounded by a swirl vane 26. The shroud 25 is provided with a convergent upstream portion 25a concentrically spaced outwardly from the outermost gas nozzle 22, a throat portion 25b, and a divergent downstream portion 25c. The throat portion 25b is positioned just downstream of the nozzles 20, 21, and 22, while the divergent portion 25c extends downstream therefrom.

Baffle means 18 supported by the shroud 25 and which is a conical shaped plate is positioned downstream of the nozzles 20, 21, and 22, the baffle means having a common axis with the concentric nozzles. The apex of the baffle shaped plate 18 is disposed toward the nozzles 20, 21, and 22. As shown in FIGURE 2, the baffle plate 18 is disposed radially inwardly of the divergent portion 25c of the shroud 25 and, thus, an annular outlet 19 is defined for the mixed gaseous and liquid fuels and air.

The downstream end of the nozzle 21 is provided with a series of drillings 27 whose upstream ends communicate with a further series of drillings 28 which concentrically surrounds the pilot fuel passage 24, the downstream ends of the drillings 27 communicating with the interior of the shroud 25.

The nozzle 22 has an annular gas fuel passage 29 therethrough whose downstream end communicates with the interior of the shroud 25.

Air which has been compressed by the compressor or compressors 11 is forced through the shroud 25.

The arrangement is thus such that the passage of either gas or liquid fuel through the shroud 25 takes place simultaneously with a flow of air through the shroud 25, the said flow of air through the shroud 25 not only effecting atomisation of the fuel but also helping to ensure that the fuel is burned away from the nozzles 20, 21, 22. Thus, carboning up of any of the nozzles 20, 21, 22 which happens to be out of action at any particular time is reduced.

The gas fuel passage 29 communicates with a gas duct 31 which extends to a gas manifold 32. Mounted within the gas duct 31 are a liquid duct 33 of relatively small cross section and a liquid duct 34 of relatively large cross section. The liquid duct 33 communicates with the pilot fuel passage 24, whilst the liquid duct 34 communicates via an annular chamber 35 with the main fuel passage or drillings 28. Both the liquid ducts 33, 34 communicates with a liquid manifold 36 so as to receive fuel therefrom.

It will thus be appreciated that the combustion equipment 12 may be operated on either gas fuel or liquid fuel with a reduced risk of carboning up of the nozzles which are not being used.

We claim:
1. A gas turbine engine fuel injector comprising a plurality of concentric nozzles, means supplying fuel to each of said nozzles, a shroud having a convergent upstream portion concentrically spaced from the outermost of said nozzles, and a divergent downstream portion extending downstream of said nozzles, and baffle means supported radially inwardly of the downstream portion of said shroud and spaced downstream of said nozzles, the arrangement being such that, in operation of the injector, the fuel emitted by said nozzles passes through said shroud simultaneously with air drawn through the upstream portion thereof and passes between said shroud and said baffle means.

2. A gas turbine engine fuel injector as claimed in claim 2 in which the said outermost nozzle is a gaseous fuel nozzle and the remainder of said nozzles are liquid fuel nozzles.

3. A gas turbine engine fuel injector as claimed in claim 2 in which said baffle means comprises a member having a substantially conical surface the axis of which is common with the axis of said nozzles, and the apex of which is disposed towards said nozzles.

4. A gas turbine engine fuel injector as claimed in claim 3 wherein said member comprises a baffle plate disposed radially inwardly of the downstream portion of the shroud.

5. A gas turbine engine fuel injector comprising concentric central and annular liquid fuel nozzles, an annular gaseous fuel nozzle concentrically surrounding said liquid fuel nozzles, a gaseous fuel duct supplying gaseous fuel to said gaseous fuel nozzle, two liquid fuel ducts mounted within the gaseous fuel duct and supplying liquid fuel to the respective central and annular liquid fuel nozzles, a shroud having a convergent upstream portion concentrically spaced from the outermost of said nozzle and a divergent downstream portion extending downstream of said nozzles, and baffle means supported by said downstream portion of the shroud and spaced downstream of said nozzles, the arrangement being such that, in operation of the injector, the fuel emitted by said nozzles passes through said shroud simultaneously with air drawn through the upstream portion thereof and passes between said shroud and said baffle means.

References Cited by the Examiner

UNITED STATES PATENTS

| 2,867,977 | 1/1959 | Buck | 60—39.72 X |
| 2,907,527 | 10/1959 | Cummings. | |
| 2,920,449 | 1/1960 | Johnson | 60—39.74 |
| 2,964,907 | 12/1960 | Toone | 60—39.72 |

MARK NEWMAN, *Primary Examiner.*

RALPH D. BLAKESLEE, *Examiner.*